(12) United States Patent
Tsuchiya et al.

(10) Patent No.: US 12,439,147 B2
(45) Date of Patent: Oct. 7, 2025

(54) CONTROL APPARATUS, IMAGE PICKUP APPARATUS, CONTROL METHOD, AND STORAGE MEDIUM

(71) Applicant: CANON KABUSHIKI KAISHA, Tokyo (JP)

(72) Inventors: Takumi Tsuchiya, Kanagawa (JP); Kazunori Takayama, Tokyo (JP); Yuji Omori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 18/317,961

(22) Filed: May 16, 2023

(65) Prior Publication Data

US 2023/0388625 A1 Nov. 30, 2023

(30) Foreign Application Priority Data

May 25, 2022 (JP) ................. 2022-085504
Oct. 5, 2022 (JP) ................. 2022-160816

(51) Int. Cl.
*H04N 23/60* (2023.01)
*G06T 7/55* (2017.01)
*G06T 7/62* (2017.01)
*G06T 7/70* (2017.01)
*H04N 23/58* (2023.01)
*H04N 23/63* (2023.01)

(52) U.S. Cl.
CPC ............... *H04N 23/64* (2023.01); *G06T 7/55* (2017.01); *G06T 7/62* (2017.01); *G06T 7/70* (2017.01); *H04N 23/58* (2023.01); *H04N 23/631* (2023.01)

(58) Field of Classification Search
CPC .... G06T 7/70; G06T 7/55; G06T 7/62; H04N 23/631; H04N 23/695; H04N 23/58; H04N 23/64
USPC ....................................... 348/207.1
See application file for complete search history.

(56) References Cited

U.S. PATENT DOCUMENTS

| | | | |
|---|---|---|---|
| 9,851,877 B2* | 12/2017 | Michiyama | G06F 3/04815 |
| 10,778,902 B2* | 9/2020 | Mori | G06T 7/62 |
| 2014/0368621 A1* | 12/2014 | Michiyama | H04N 13/156 348/50 |
| 2019/0379836 A1* | 12/2019 | Mori | G06T 7/62 |
| 2020/0357126 A1* | 11/2020 | Takahashi | H04N 23/661 |
| 2022/0036578 A1* | 2/2022 | Munsey, Jr. | G06T 7/75 |
| 2023/0283878 A1* | 9/2023 | Huang | H04N 21/8549 348/207.11 |
| 2023/0368492 A1* | 11/2023 | Xu | G06V 20/52 |

FOREIGN PATENT DOCUMENTS

JP 2014-155173 A 8/2014

* cited by examiner

*Primary Examiner* — Pritham D Prabhakher
(74) *Attorney, Agent, or Firm* — Venable LLP

(57) ABSTRACT

A control apparatus includes an acquiring unit configured to acquire information about three-dimensional space obtained using a distance measuring unit and information about a three-dimensional figure specified by a user, a determining unit configured to determine a search area based on the information about the three-dimensional space and the information about the three-dimensional figure, and a control unit configured to automatically control an angle of view so that a main object in the search area is included in an imaging angle of view.

28 Claims, 15 Drawing Sheets

CONTROL APPARATUS, IMAGE PICKUP APPARATUS, CONTROL METHOD, AND STORAGE MEDIUM

BACKGROUND

Technical Field

One of the aspects of the disclosure relates to a control apparatus, an image pickup apparatus, a control method, and a storage medium.

Description of Related Art

Some conventional image pickup apparatuses automatically control an imaging angle of view (auto-framing) without the operation of the user. Japanese Patent Laid-Open No. 2014-155173 discloses an image pickup apparatus that auto-releases using a three-dimensional arbitrary virtual object specified in three-dimensional space. More specifically, this image pickup apparatus can automatically perform imaging without the operation of the user by automatically capturing the image when an object in real space exits or enters the virtual object.

The image pickup apparatus disclosed in Japanese Patent Laid-Open No. 2014-155173 does not disclose searching a search area for an object based on the virtual object, so the apparatus cannot perform auto-framing.

SUMMARY

One of the aspects of the present disclosure provides a control apparatus that can perform auto-framing control using a search area that correctly reflects the intention of the user.

A control apparatus according to one aspect of the disclosure includes at least one processor, and a memory coupled to the at least one processor. The memory has instructions that, when executed by the processor, configure the processor to operate as an acquiring unit configured to acquire information about three-dimensional space obtained using a distance measuring unit and information about a three-dimensional figure specified by a user, a determining unit configured to determine a search area based on the information about the three-dimensional space and the information about the three-dimensional figure, and a control unit configured to automatically control an angle of view so that a main object in the search area is included in an imaging angle of view. An image pickup apparatus having the above control apparatus also constitutes another aspect of the disclosure. A control method corresponding to the above control apparatus also constitutes another aspect of the disclosure. A non-transitory computer-readable storage medium storing a program that causes a computer to execute the above control method also constitutes another aspect of the disclosure.

Further features of the disclosure will become apparent from the following description of embodiments with reference to the attached drawings.

DESCRIPTION OF THE EMBODIMENTS

Referring now to the accompanying drawings, a description will be given of embodiments according to the disclosure.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Figure 1:
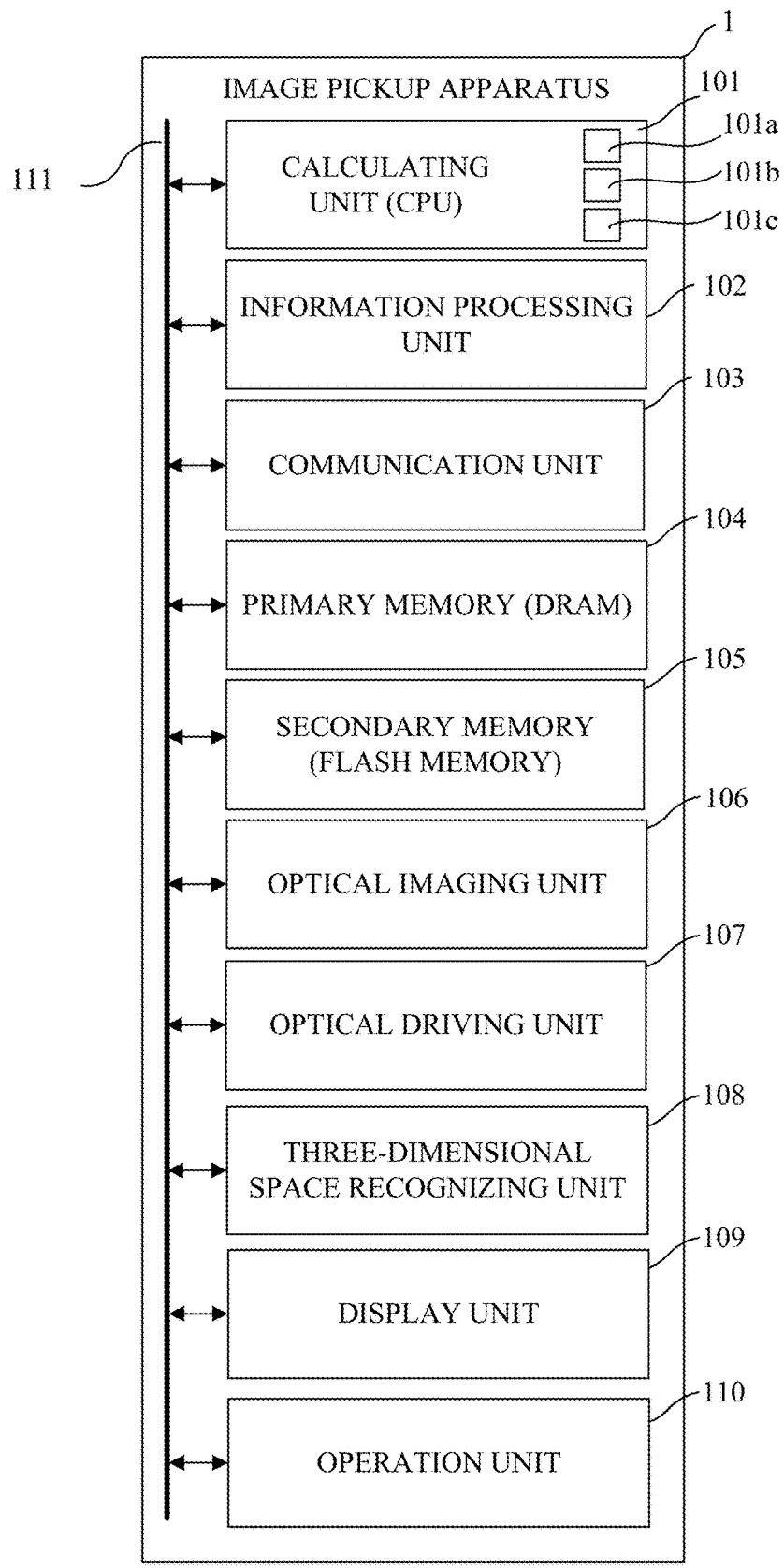
FIG. 1 is a block diagram of an image pickup apparatus according to each embodiment.
Figure 2:
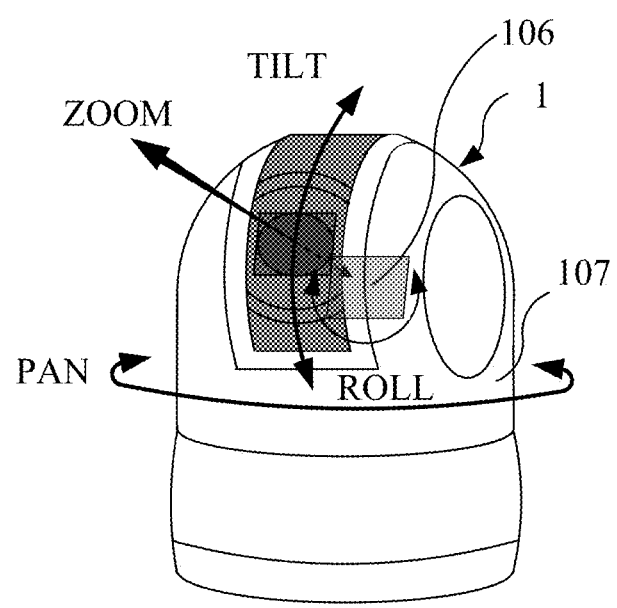
FIG. 2 is an external view of the image pickup apparatus according to each embodiment.

Referring now to FIGS. 1 and 2, a description will be given of an image pickup apparatus 1 according to each embodiment. FIG. 1 is a block diagram illustrating a hardware configuration of the image pickup apparatus 1. FIG. 2 is an external view of the image pickup apparatus 1. In FIGS. 1 and 2, the same element is designated by the same reference numeral.

The image pickup apparatus 1 includes a calculating unit (CPU) 101, an information processing unit 102, a communication unit 103, a primary memory (DRAM) 104, a secondary memory (flash memory) 105, an optical imaging unit 106, an optical driving unit 107, three-dimensional space recognizing unit 108, a display unit 109, and an operation unit 110. Each part of the image pickup apparatus 1 can exchange data via a bus 111.

The calculating unit 101 is a control apparatus configured to control each component of the image pickup apparatus 1, and includes an acquiring unit 101a, a determining unit 101b, and a control unit 101c. The acquiring unit 101a acquires information about three-dimensional space recognized by the three-dimensional space recognizing unit 108 (obtained using a distance measuring unit of the three-dimensional space recognizing unit 108) and a three-dimensional figure (virtual object) specified by the user. The determining unit 101b determines a search area based on information about the three-dimensional space and information about the three-dimensional figure (based on the three-dimensional space and the three-dimensional figure disposed in the three-dimensional space). The control unit 101c automatically performs angle-of-view control (auto-framing control) so that the main object in the search area is included in the imaging angle of view.

The information processing unit 102 performs calculation processing for image data acquired by the optical imaging unit 106, calculation processing for various evaluation values acquired by the optical imaging unit 106, calculation processing for data acquired by the communication unit 103, and calculation processing for data for use with control of the optical driving unit 107. The communication unit 103 functions as a communication unit configured to communicate with an external device or the like. The primary memory 104 temporarily stores data for the calculating unit 101 or the information processing unit 102. The secondary memory 105 stores data for the processing of the calculating unit 101, recorded images processed and encoded by the information processing unit 102, and the like.

The optical imaging unit 106 includes an optical system and an image sensor, and functions as an imaging unit configured to photoelectrically convert an object image (optical image) formed by the optical system and to output image data. The optical driving unit 107 functions as a driving unit configured to drive the optical system of the optical imaging unit 106 and to change the position of the optical system. The optical system can drive the zoom and iris (aperture) through the optical driving unit 107, and can rotate the angle of view about at least one of a panning axis, a tilting axis, and a rolling axis, for example. Rotation about the panning axis and tilting axis is performed by adjusting the angle of the entire optical imaging unit 106 including the optical system and image sensor. Rotation about the rolling axis is performed by adjusting the angle of the image sensor. The image pickup apparatus 1 may be movable in at least one of a vertical direction, a horizontal direction, and a depth direction. Each embodiment describes a representative automatic imaging camera as the image pickup apparatus 1, but the form of the optical driving unit 107 of the image pickup apparatus 1 is not limited. For example, the image pickup apparatus 1 may be configured to be capable of framing by moving or rotating the body itself like a drone, or may include the optical driving unit 107 using external equipment like a moving platform such as a gimbal.

The three-dimensional space recognizing unit 108 includes a distance measuring unit such as a stereo camera and a Time of Flight (ToF) sensor, and functions as a recognition unit configured to recognize distance information in the real space (three-dimensional space) using the distance measuring unit. In this embodiment, the information (three-dimensional space information) on the three-dimensional space recognized by the three-dimensional space recognizing unit 108 is output to the calculating unit 101 and acquired by the acquiring unit 101a of the calculating unit 101. The three-dimensional space recognizing unit 108 is not limited to the configuration integrated with the image pickup apparatus 1, but may be separated from the camera body of the image pickup apparatus 1 (physically separated from the camera body). The three-dimensional space recognizing unit 108 is not limited to a configuration having a single distance measuring unit, but may include a plurality of distance measuring units spaced from each other. The three-dimensional space recognizing unit 108 may recognize the three-dimensional space utilizing distance information measured by the plurality of distance measuring units.

The display unit 109 functions as a display such as a display equipped with a touch panel, for example, and can display images and input operations using a finger of the user, a stylus, or the like. The operation unit 110 functions as an operation unit configured to input the operation of the user, such as a button or a dial. The operation unit 110 may include one or more buttons and dials, or may be replaced with the display unit 109.

A description will now be given of six embodiments. A first embodiment relates to auto-framing control using a single image pickup apparatus. The auto-framing control refers to automatic control of an imaging angle of view without the operation of the user, such as pan/tilt control to include a main object and/or automatic zooming control to keep a predetermined size for the main object within the angle of view. A second embodiment relates to auto-framing control using a plurality of image pickup apparatus in association. A third embodiment is an embodiment in which information about the three-dimensional space (three-dimensional space information) recognized by the three-dimensional space recognizing unit 108 is expressed in a relative coordinate system from the image pickup apparatus 1 to easily perform auto-framing control. A fourth embodiment is an embodiment in which auto-framing control is performed so that a main object and an area specified by the user (user specified area) are included in an imaging angle of view. A fifth embodiment is an embodiment that performs auto-framing control so that the main object and the area outside the search area specified by the user are included in the imaging angle of view. A sixth embodiment is an embodiment that performs auto-framing control so that the main object and a plurality of areas specified by the user are included in the imaging angle of view.

First Embodiment

Figure 3:
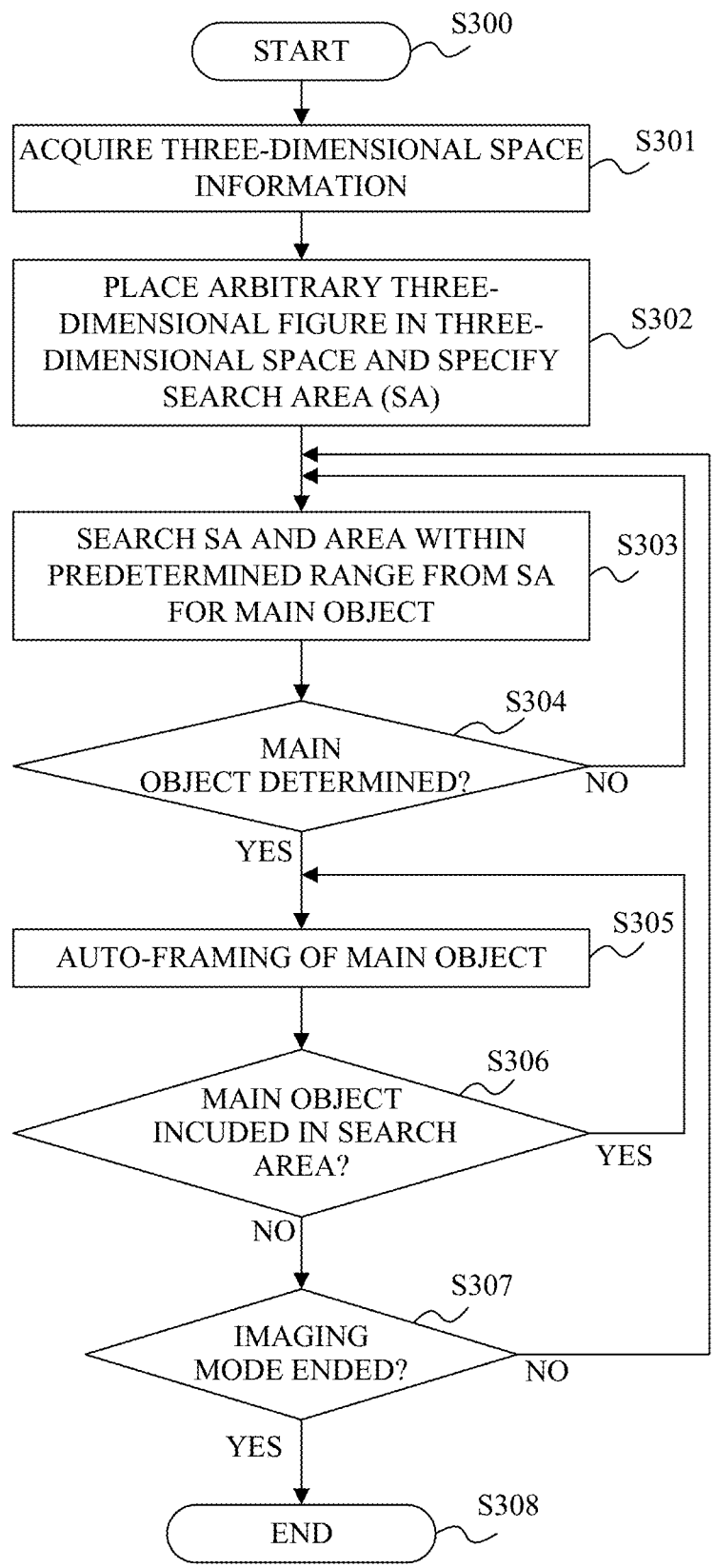
FIG. 3 is a flowchart of a control method according to a first embodiment.
Figure 4:
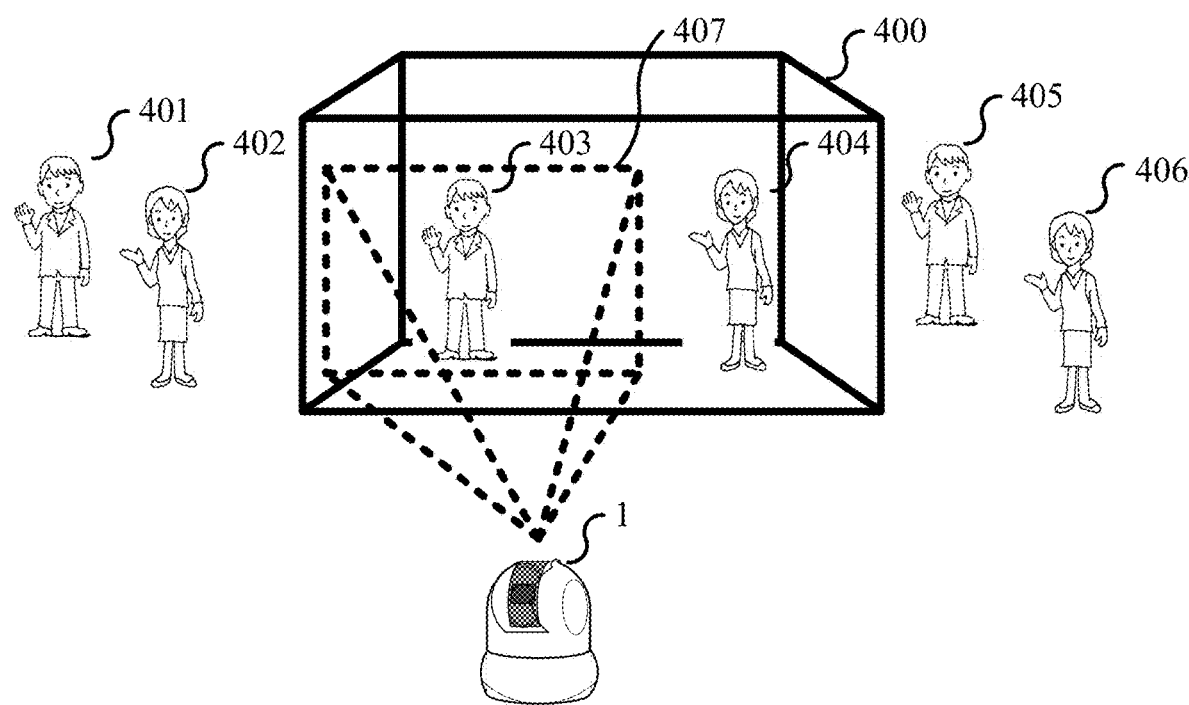
FIG. 4 is a schematic diagram illustrating a relationship between a search area and an auto-framing position in the first embodiment.
Figure 5:
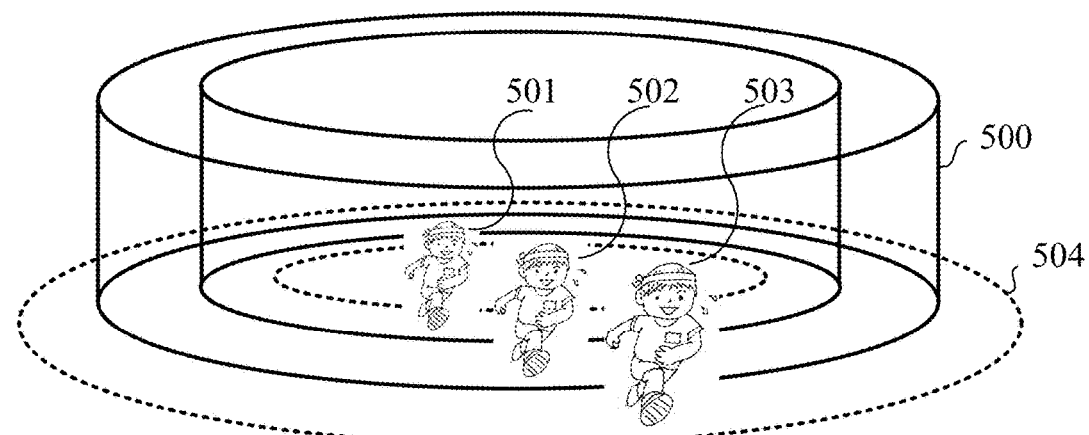
FIG. 5 illustrates an example of a search area having a complicated shape in the first embodiment.

Referring now to FIGS. 3 to 5, a description will be given of a control method (auto-framing control) according to a first embodiment. The control method according to this embodiment is executed using the image pickup apparatus 1 illustrated in FIGS. 1 and 2. FIG. 3 is a flowchart of the control method according to this embodiment. FIG. 4 is a schematic diagram illustrating a relationship between a search area and an auto-framing position. FIG. 5 illustrates an example of a search area having a complicated shape.

First, auto-framing control starts in step S300 of FIG. 3. In this embodiment, in a case where the user operates the operation unit 110 of the image pickup apparatus 1 to transition the image pickup apparatus 1 to an imaging mode, the calculating unit 101 of the image pickup apparatus 1 starts the auto-framing control in step S300. The calculating unit 101 executes a program based on the following flow.

In step S301, the calculating unit 101 (acquiring unit 101a) acquires three-dimensional space information that defines a model and arrangement of each object in the real space generated based on an image from at least one viewpoint and distance information from the three-dimensional space recognizing unit 108. The three-dimensional space information acquired by the calculating unit 101 is stored in the primary memory 104. Next, in step S302, the calculating unit 101 places a virtual object 400 as illustrated in FIG. 4, in accordance with an instruction from the user input via the communication unit 103 or the operation unit 110. That is, the calculating unit 101 generates an image in which the virtual object 400 is superimposed on the real space (three-dimensional space). This embodiment can utilize, for example, technologies such as Augmented Reality (AR) and Mixed Reality (MR). The image pickup apparatus 1 can use a camera such as a head mount display (HMD), a camera mounted smartphone, or a tablet terminal. Thereby, the virtual object 400 can be placed (mapped) at a position that has information in the depth direction and is linked with the real space (absolute position associated with the real space).

In this embodiment, a search area as a target for auto-framing is an inner area of the virtual object 400. However, this embodiment is not limited to this example. The search area may be an area outside the virtual object 400. The virtual object 400 can be set so that it is displayed as an auxiliary image in a live-view (LV) image, but is not displayed in a recorded image.

The virtual object 400 is an arbitrary three-dimensional figure. For example, the virtual object 400 can be set by acquiring information about an arbitrary three-dimensional figure created in advance using a computer or the like from an external device (such as an information processing apparatus or a second image pickup apparatus) via the communication unit 103. Alternatively, the virtual object 400 may be set by selecting a figure having a basic shape such as a rectangular parallelepiped or a cylinder (a figure created in advance and stored in the image pickup apparatus 1) using the operation unit 110, and disposing the selected figure at a desired position in the LV image displaced on the display unit 109. The virtual object 400 is disposed at a position associated with the three-dimensional space information acquired in step S301, and stored in the image pickup apparatus 1 as position information relative to the three-dimensional space (information about the absolute position) rather than conventional information about relative position to the image pickup apparatus.

In FIG. 4, the search area (the internal area of the virtual object 400) has a rectangular parallelepiped shape, but is not limited to this example, and the search area may be, for example, a doughnut-shaped figure (internal area of a virtual object 500) as illustrated in FIG. 5. FIG. 5 illustrates an example in which the virtual object 500 is placed only on a center lane of a land track 504, and auto-framing is performed by setting to the main object an object 502 running in the center lane among objects 501 to 503. In this case, the objects 501 and 503 running in lanes other than the center lane can be excluded from auto-framing targets.

Next, in step S303 of FIG. 3, the calculating unit 101 controls the optical driving unit 107 so that the search area and an area within a predetermined range from the search area are accommodated in the imaging angle of view of the optical imaging unit 106. The calculating unit 101 searches the search area and an area within a predetermined range from the search area (performs object search) for the main object. The main object may be searched for among objects entirely included in the search area, or may be searched for among objects partially included in the search area. For example, the calculating unit 101 (determining unit 101b) determines the main object based on the overlap degree between the search area and the object. In a case where the calculating unit 101 determines that the entire object is included in the search area based on the overlap degree, the calculating unit 101 determines that this object is the main object. Alternatively, the calculating unit 101 may determine the object as the main object when determining that part of the object is included in the search area based on the overlap degree. The search for the main object is performed based on, for example, well-known general object recognition results, feature point detection results, motion vector detection results, or the like.

Next, in step S304, the calculating unit 101 determines whether or not the main object has been determined. In a case where the main object has been determined, the flow proceeds to step S305. On the other hand, in a case where the main object has not yet been determined, the flow returns to step S303. In FIG. 4, among objects 401 to 406, the objects 403 and 404 included in the virtual object 400 are targets for auto-framing, and among the objects 403 and 404 as the targets for auto-framing, the object 403 is determined as the main object.

In step S305, the calculating unit 101 controls the optical driving unit 107 so that the main object (object 403) is placed within the imaging angle of view and determines the auto-framing position 407. Next, in step S306, the calculating unit 101 determines whether or not the main object is included in the search area. In a case where the main object is included in the search area, the flow returns to step S305 and the calculating unit 101 continues the auto-framing. In a case where the main object is not included in the search area, the calculating unit 101 once stops the auto-framing and the flow proceeds to step S307. In step S307, the calculating unit 101 determines whether or not the imaging mode has ended, that is, whether or not the operation unit 110 has instructed to end the imaging mode. In a case where the imaging mode has ended, the flow proceeds to step S308 to end imaging (auto-framing control). In a case where the imaging mode has not yet ended, the flow returns to step S303, the calculating unit 101 searches for and determines a new main object, and performs auto-framing for the determined new main object.

In this embodiment, the information processing unit 102 of the image pickup apparatus 1 performs various calculation processing. The image pickup apparatus 1 may communicate with an external device such as a cloud using the communication unit 103, and the calculation processing may be performed on the external device such as the cloud. The auto-framing control according to this embodiment is applicable to both still image capturing and moving image capturing.

This embodiment can specify a search area having a complicated shape. This embodiment can map the search area on the real space as absolute coordinates. That is, even if the image pickup apparatus 1 is moved, the search area does not move, and the search area can be fixed at the mapped position in the real space.

Second Embodiment

Figure 6:
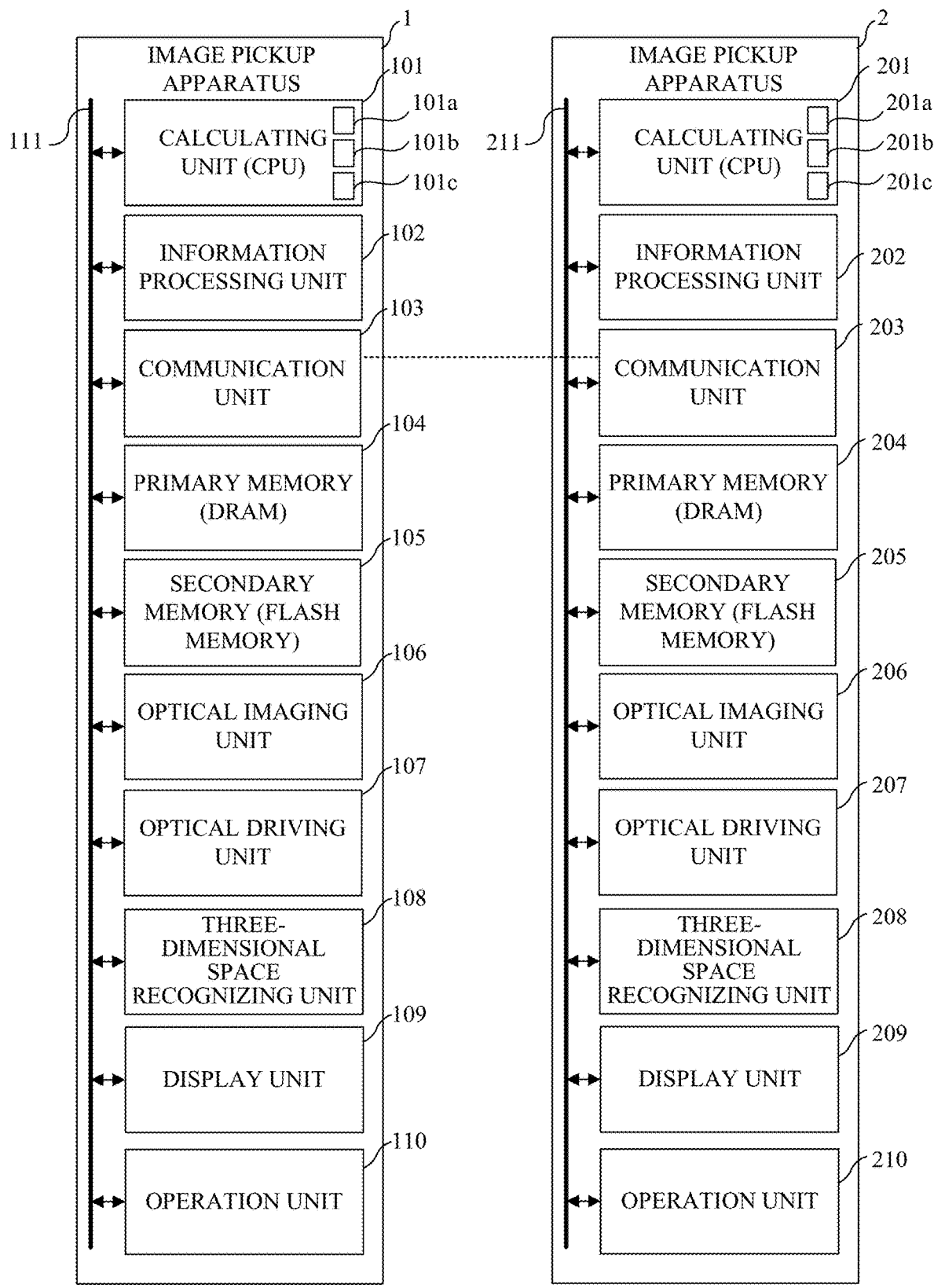
FIG. 6 is a block diagram of image pickup apparatuses according to a second embodiment.
Figure 7:
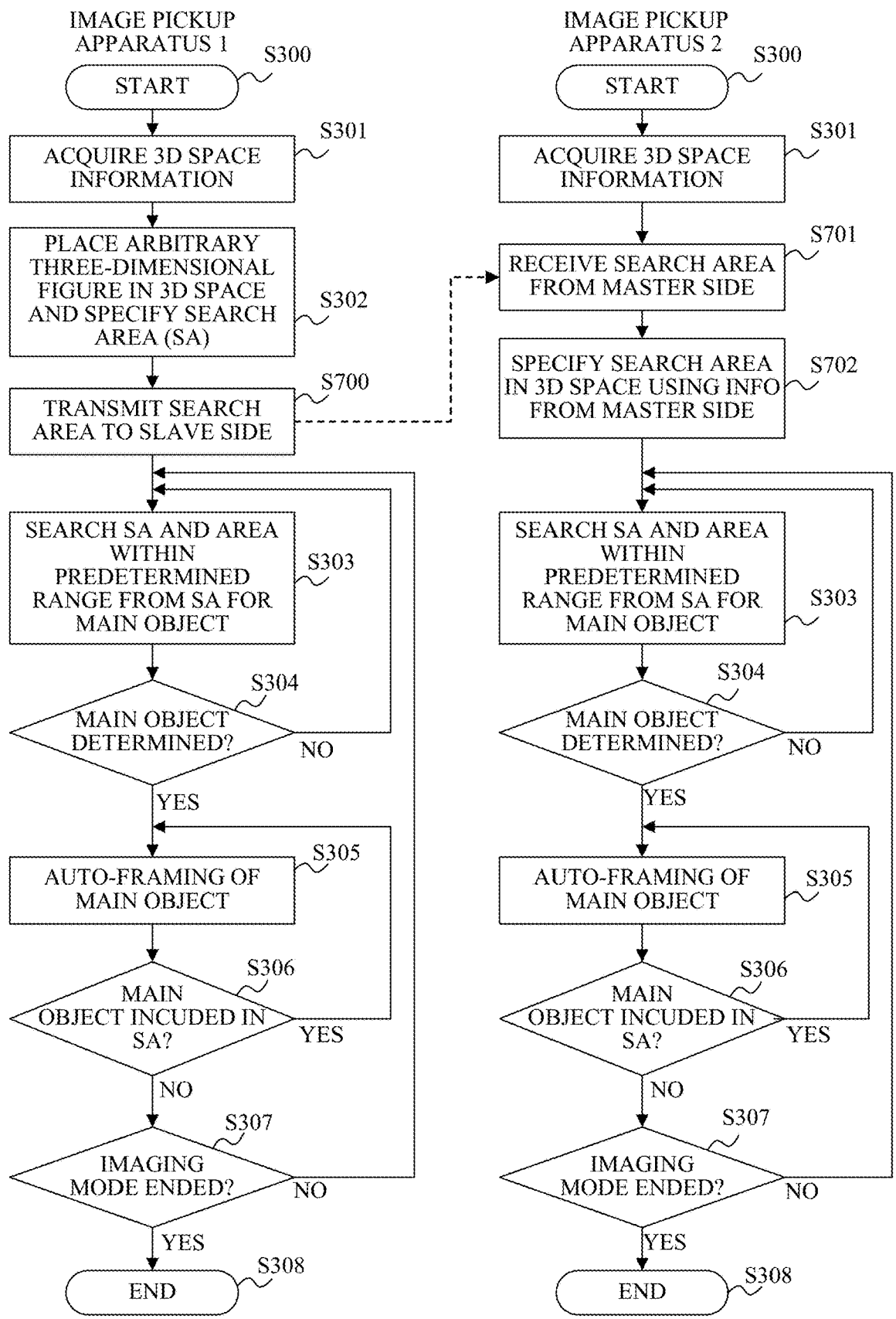
FIG. 7 is a flowchart of a control method according to the second embodiment.
Figure 8:
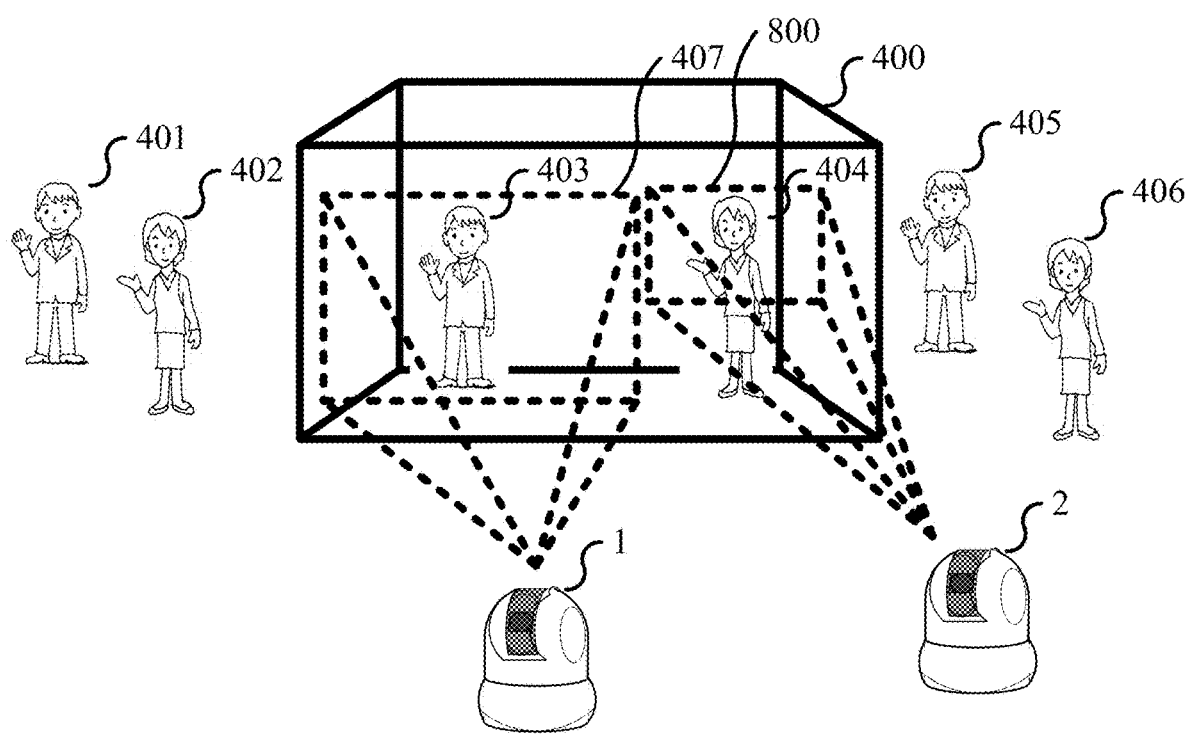
FIG. 8 is a schematic diagram illustrating a relationship between a search area and an auto-framing position in the second embodiment.

Referring now to FIGS. 6 to 8, a description will be given of a control method (auto-framing control) according to a second embodiment. In the first embodiment, an example of auto-framing control is performed using a single image pickup apparatus. In a case where auto-framing control is performed in a common search area using a plurality of image pickup apparatuses, it is necessary to specify a search area for each of the plurality of image pickup apparatuses. Accordingly, this embodiment performs auto-framing control in association with a plurality of image pickup apparatuses and simplifies sharing of the search area.

FIG. 6 is a block diagram illustrating hardware configurations of an image pickup apparatus (first image pickup apparatus) 1 and an image pickup apparatus (second image pickup apparatus) 2 in this embodiment. Since the image pickup apparatus 1 illustrated in FIG. 6 has the same hardware configuration as the image pickup apparatus 1 illustrated in FIG. 1, a description thereof will be omitted. The image pickup apparatus 2 includes a calculating unit (CPU) 201, an information processing unit 202, a communication unit 203, a primary memory (DRAM) 204, a secondary memory (flash memory) 205, an optical imaging unit 206, an optical driving unit 207, three-dimensional space recognizing unit 208, a display unit 209, and an operation unit 210. The calculating unit 201 includes an acquiring unit 201a, a determining unit 201b, and a control unit 201c. Each component of the image pickup apparatus 2 can exchange data via a bus 211. Each component of the image pickup apparatus 2 is the same as that of the image pickup apparatus 1, so a description thereof will be omitted. The image pickup apparatuses 1 and 2 communicate with each other via the communication unit 103 and the communication unit 203. In this embodiment, the image pickup apparatus 1 will be described as a master-side image pickup apparatus that transmits a search area, and the image pickup apparatus 2 will be described as a slave-side image pickup apparatus that receives the search area.

FIG. 7 is a flowchart of a control method according to this embodiment. FIG. 8 is a schematic diagram illustrating a relationship between a search area and an auto-framing position. In FIG. 7, steps similar to those in FIG. 3 will be designated by the same reference numerals, and a description thereof will be omitted.

In a case where the calculating unit 101 of the image pickup apparatus 1 specifies a search area in step S302, the flow proceeds to step S700. In step S700, the calculating unit 101 transmits information on the shape and position of the virtual object 400 corresponding to the search area to the communication unit 203 of the image pickup apparatus 2 (slave-side image pickup apparatus) using the communication unit 103 of the image pickup apparatus 1.

In step S701, the calculating unit 201 of the image pickup apparatus 2 receives information on the shape and position of the virtual object 400 from the communication unit 103 of the image pickup apparatus 1 (master-side image pickup apparatus) using the communication unit 203. Next, in step S702, the calculating unit 201 associates the received information about the virtual object 400 with the three-dimensional space information acquired using the three-dimensional space recognizing unit 208, disposes the virtual object 400 in the three-dimensional space information about the image pickup apparatus 2, and specifies a search area. Thereby, the image pickup apparatuses 1 and 2 share the virtual object 400, as illustrated in FIG. 8. Each of the image pickup apparatuses 1 and 2 can perform auto-framing control over the objects 403 and 404 included in the virtual object 400. FIG. 8 illustrates an example in which an auto-framing position 407 is determined so that the object 403 is located within the imaging angle of view of the image pickup apparatus 1, and an auto-framing position 800 is determined so that the object 404 is located within the imaging angle of view of the image pickup apparatus 2.

This embodiment has described the association of two image pickup apparatuses, but is not limited to this example. This embodiment is also applicable to the association of three or more image pickup apparatuses. In this embodiment, the image pickup apparatus 1 is assumed to be the master side and the image pickup apparatus 2 is assumed to be the slave side, but these two image pickup apparatuses 1 and 2 may both have master and slave functions.

This embodiment can simplify sharing of the search area in auto-framing control using a plurality of image pickup apparatuses.

Third Embodiment

Figure 9:
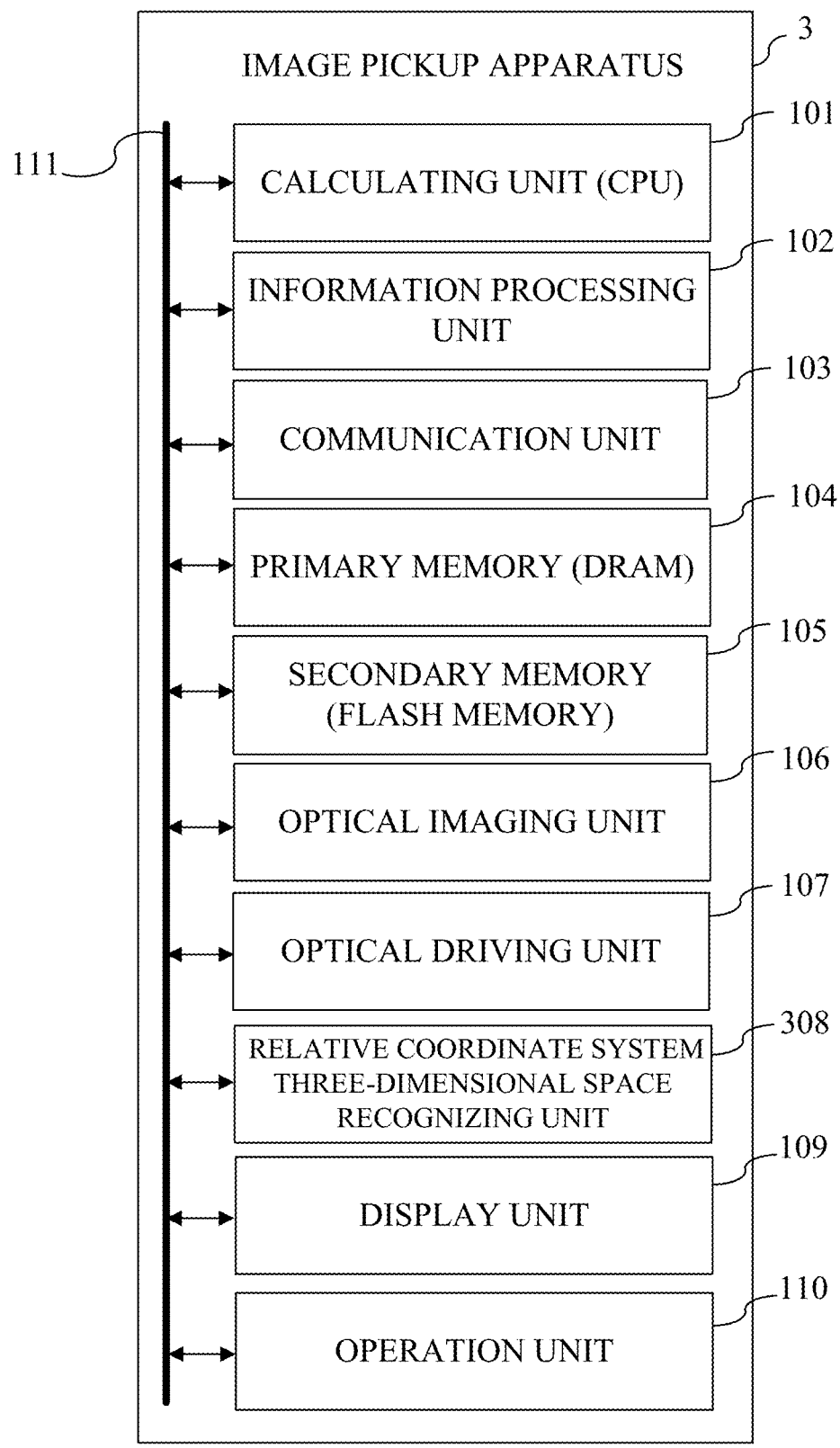
FIG. 9 is a block diagram of an image pickup apparatus according to a third embodiment.
Figure 12:
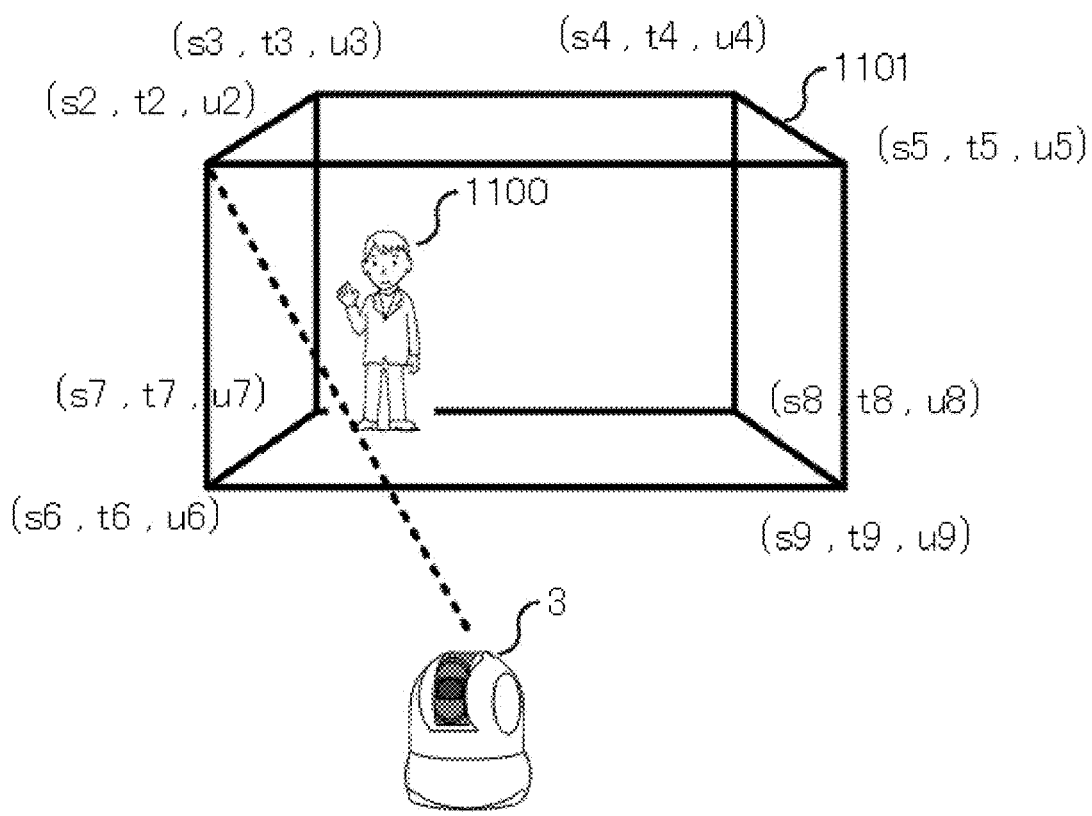
FIG. 12 is a schematic diagram illustrating a relationship between a search area and an auto-framing position in the third embodiment.

Referring now to FIGS. 9 and 12, a description will be given of a control method (auto-framing control) according to a third embodiment. In the first embodiment, an example of auto-framing control is performed using a single image pickup apparatus. In the second embodiment, auto-framing control is performed in association with a plurality of image pickup apparatuses to simplify sharing of a search area. In a case where three-dimensional space information is represented by an absolute coordinate system in the three-dimensional space recognizing unit 108, a calibration operation is required that causes the three-dimensional space to be recognized in advance. In a case where distance information is obtained by a distance measuring unit attached to the image pickup apparatus, the distance information from the image pickup apparatus is usually used (or a relative coordinate system is used). Therefore, after the position of the image pickup apparatus on absolute coordinates is acquired, it is necessary to convert from the relative coordinates to the absolute coordinates. In other words, complicated processing is required. Accordingly, this embodiment represents the three-dimensional space information by a relative coordinate system from the image pickup apparatus 1, and easily performs auto-framing control.

FIG. 9 is a block diagram illustrating a hardware configuration of an image pickup apparatus 3 according to this embodiment. In the image pickup apparatus 3 illustrated in FIG. 9, those elements having the same hardware configurations as those of the image pickup apparatus 1 illustrated in FIG. 1 will be designated by the same reference numerals, and a description thereof will be omitted. The image pickup apparatus 3 includes a three-dimensional space recognizing unit 308. The three-dimensional space recognizing unit 308 includes a distance measuring unit such as a stereo camera and a ToF sensor, and functions as a recognizing unit configured to recognize distance information between the camera and the object in the real space (three-dimensional space) using the distance measuring unit. In this embodiment, information (three-dimensional space information) on three-dimensional space recognized by the three-dimensional space recognizing unit 308 is output to the calculating unit 101 and acquired by the acquiring unit 101a of the calculating unit 101.

Figure 10:
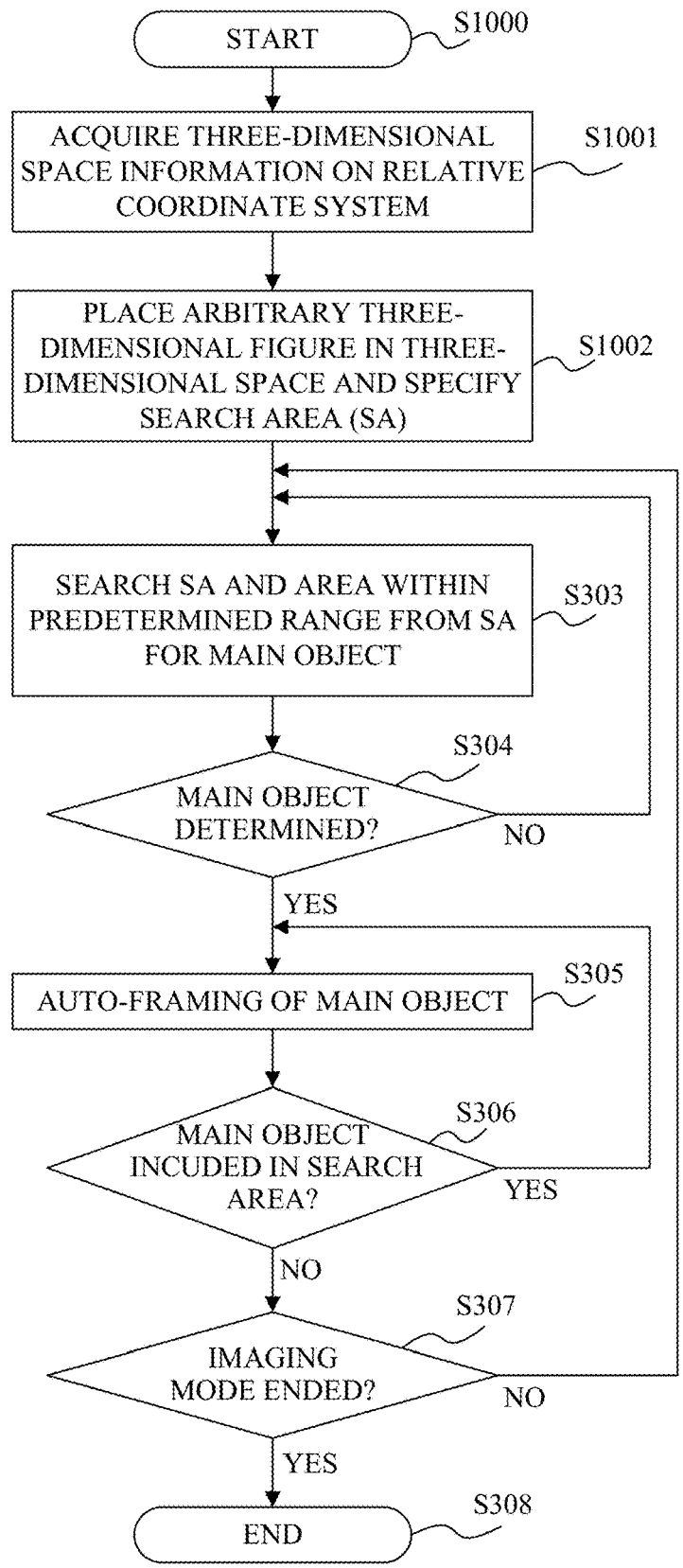
FIG. 10 is a flowchart of a control method according to the third embodiment.
Figure 11:
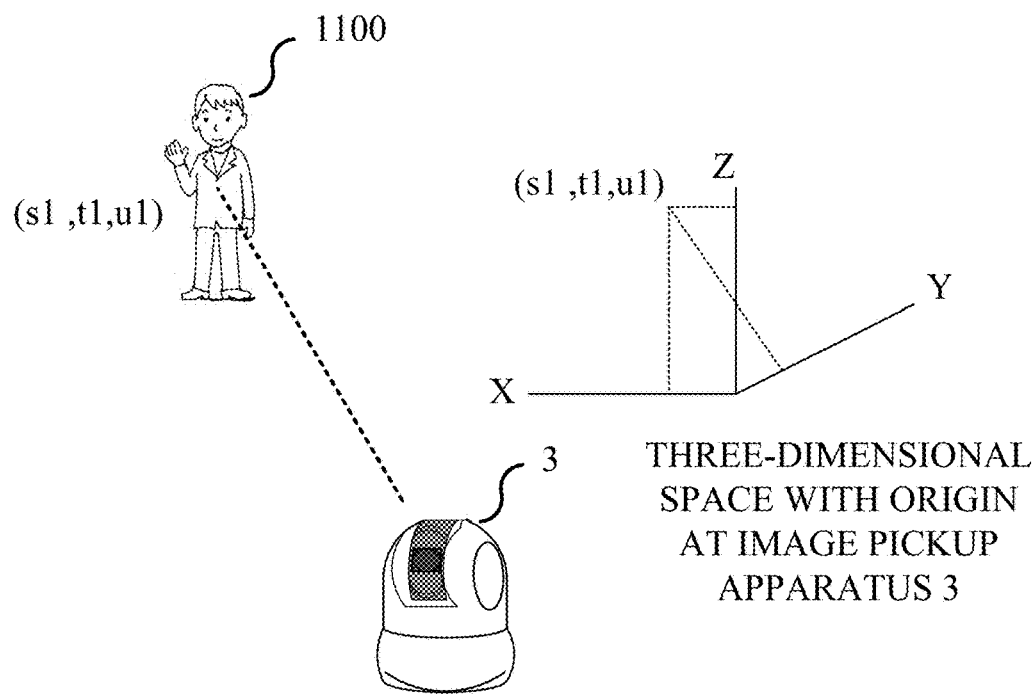
FIG. 11 illustrates a distance measurement result in the third embodiment.

FIG. 10 is a flowchart of a control method according to this embodiment. FIG. 11 is a schematic diagram illustrating the measurement result of the distance from the image pickup apparatus 3 to an object 1100. In FIG. 10, steps similar to those in FIG. 3 will be designated by the same reference numerals, and a description thereof will be omitted.

First, auto-framing control starts in step S1000 of FIG. 10. In this embodiment, in a case where the user operates the operation unit 110 of the image pickup apparatus 3 to transition the image pickup apparatus 3 to an imaging mode, the calculating unit 101 of the image pickup apparatus 3 starts the auto-framing control in step S1000. The calculating unit 101 executes a program based on the following flow.

In step S1001, the calculating unit 101 (acquiring unit 101a) acquires three-dimensional space information about a relative coordinate system from the three-dimensional space recognizing unit 308. The three-dimensional space information about the relative coordinate system is three-dimensional space information that defines a model and arrangement of each object in the real space generated based on an image from at least one viewpoint and distance information.

The distance information is usually represented by a relative coordinate system between the camera and the object. FIG. 11 illustrates the measurement result of the distance from the image pickup apparatus 3 to the object 1100, which is located at (s1, t1, u1) in the relative coordinate system. In a case where the real space is represented by the absolute coordinate system, conversion from the relative coordinate system to the absolute coordinate system is necessary, but in a case where the real space is represented by the relative coordinate system, this conversion is unnecessary.

The three-dimensional space information acquired by the calculating unit 101 is stored in the primary memory 104. Next, in step S1002, the calculating unit 101 places a virtual object 1101 as illustrated in FIG. 12, in accordance with an instruction from the user input via the communication unit 103 or the operation unit 110. That is, the calculating unit 101 generates an image in which the virtual object 1101 is superimposed on the real space (three-dimensional space). Thereby, the virtual object 1101 can be placed (mapped) at a position that has information in the depth direction and is linked with the real space (absolute position associated with the real space). In FIG. 12, the virtual object 1101 is disposed at positions (s1, t1, u1) to (s9, t9, u9).

Fourth Embodiment

Figure 13:
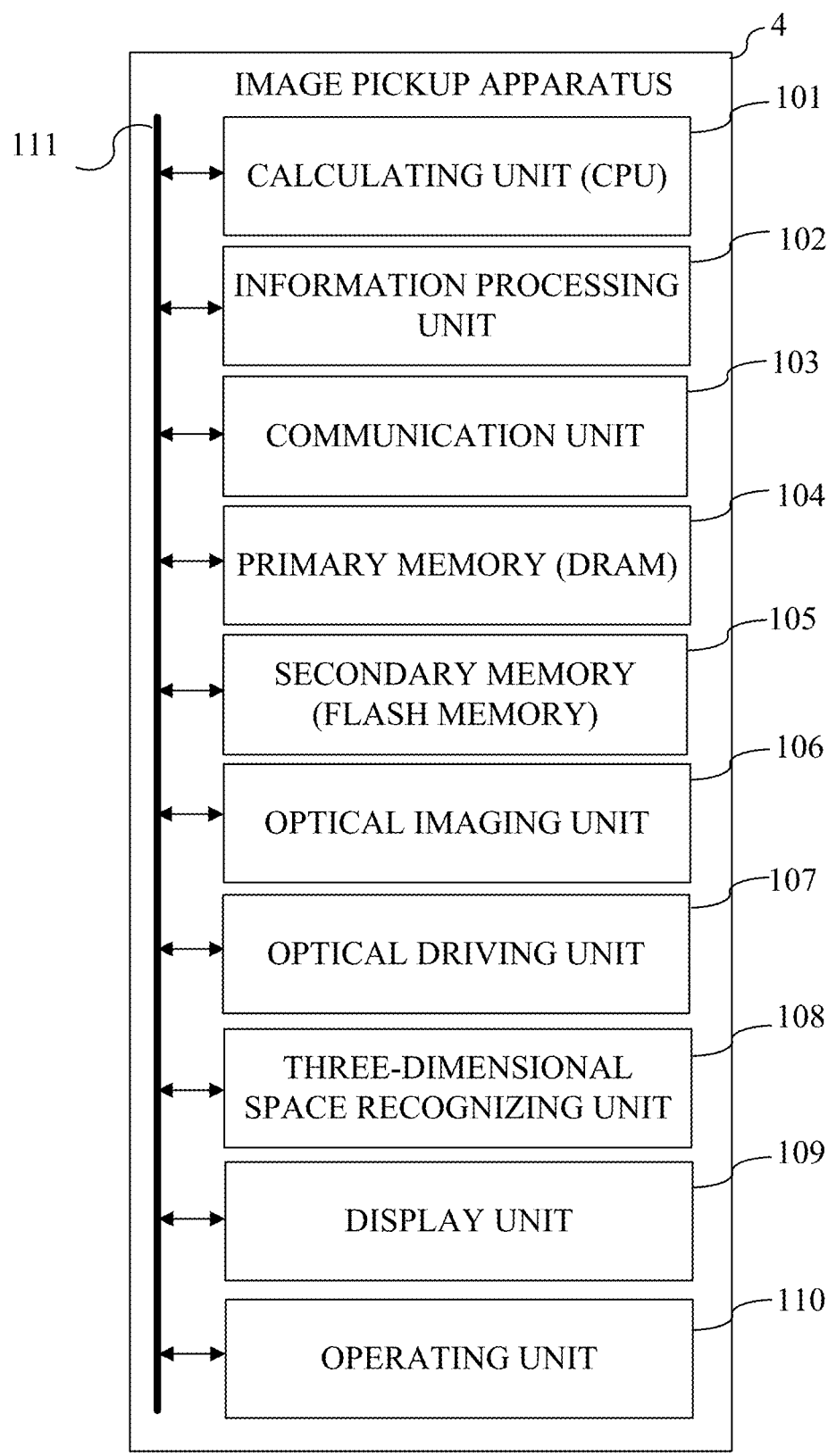
FIG. 13 is a block diagram of an image pickup apparatus according to a fourth embodiment.
Figure 14:
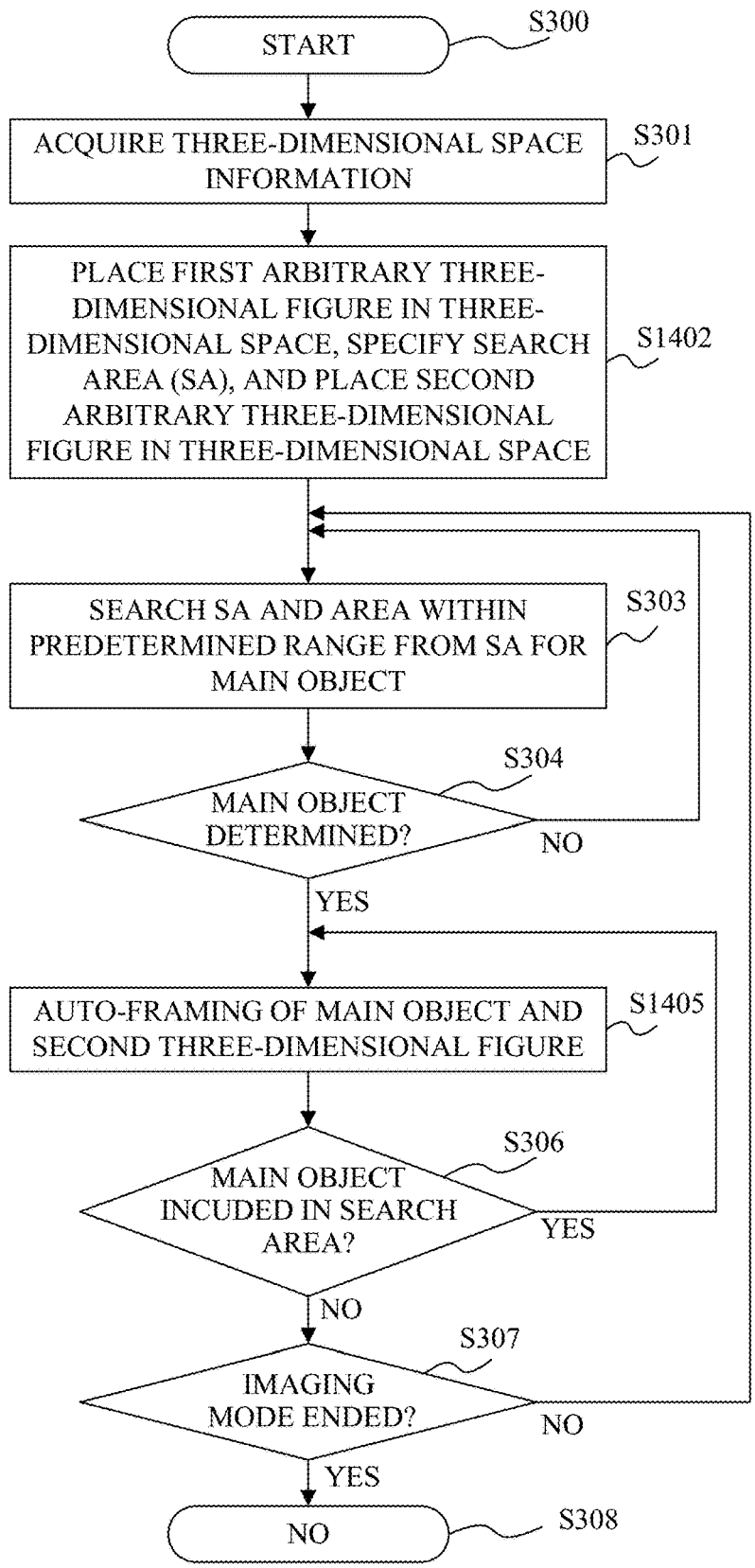
FIG. 14 is a flowchart of a control method according to the fourth embodiment.
Figure 15:
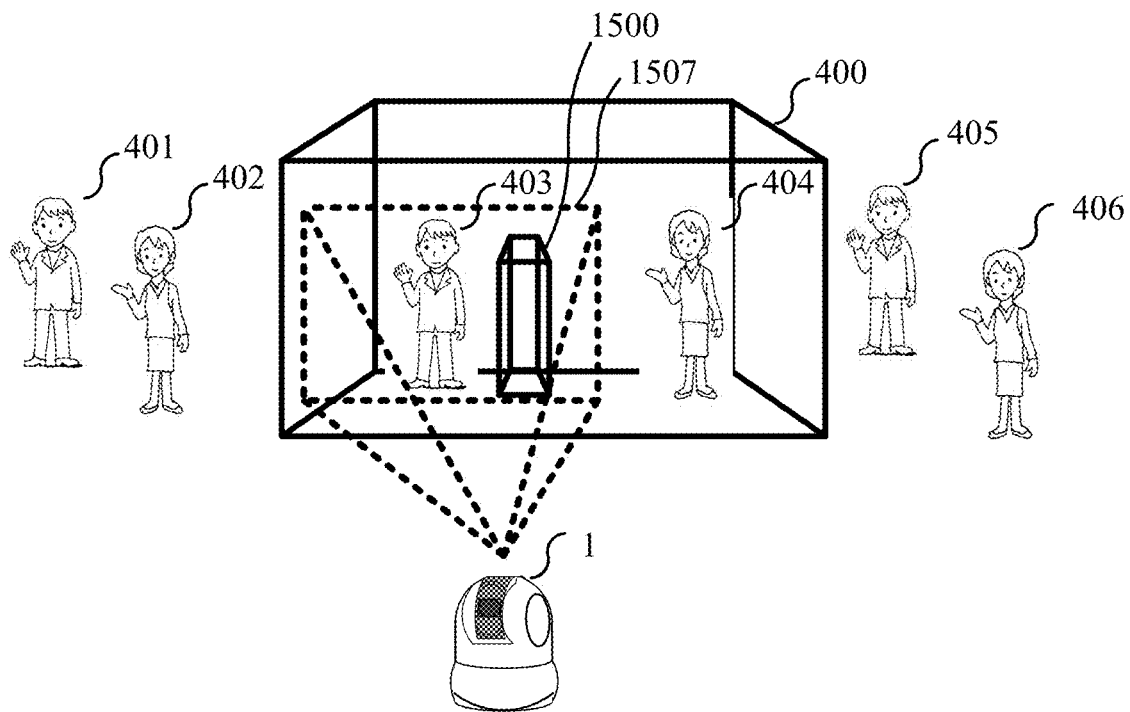
FIG. 15 is a schematic diagram illustrating a relationship between a search area and an auto-framing position in the fourth embodiment.

Referring now to FIGS. 13 to 15, a description will be given of a control method (auto-framing control) according to a fourth embodiment. In the first embodiment, an example of auto-framing control is performed using a single image pickup apparatus. In the second embodiment, auto-framing control is performed in association with a plurality of image pickup apparatuses to simplify sharing of the search area. In the third embodiment, an example of auto-framing control is performed that represents three-dimensional space information in a relative coordinate system. In a case where there is an area other than the main object to be included in the imaging angle of view in addition to the main object, the user needs to specify the area other than the main object to be included in the imaging angle of view. This embodiment performs auto-framing control so that both the main object and the area other than the main object specified by the user are included in the imaging angle of view.

FIG. 13 is a block diagram illustrating a hardware configuration of an image pickup apparatus 4 according to this embodiment. In the image pickup apparatus 4 illustrated in FIG. 13, those elements having the same hardware configurations as those of the image pickup apparatus 1 illustrated in FIG. 1 will be designated by the same reference numerals, and a description thereof will be omitted. FIG. 14 is a flowchart of a control method according to this embodiment. In FIG. 14, steps similar to those in FIG. 3 will be designated by the same reference numerals, and a description thereof will be omitted. FIG. 15 is a schematic diagram illustrating a relationship between a search area and an auto-framing position. In FIG. 15, objects similar to those in FIG. 4 will be designated by the same reference numerals, and a description thereof will be omitted.

In step S1402 in FIG. 14, the calculating unit 101 places virtual objects 400 and 1500 as illustrated in FIG. 15, in accordance with an instruction from the user input via the communication unit 103 or the operation unit 110. That is, the calculating unit 101 generates an image in which the virtual objects 400 and 1500 are superimposed on the real space (three-dimensional space). This embodiment, can utilize, for example, technologies such as Augmented Reality (AR) and Mixed Reality (MR). The image pickup apparatus 1 can use a camera such as a HMD, a camera mounted smartphone, or a tablet terminal. Thereby, the virtual objects 400 and 1500 can be disposed (mapped) at positions that have information in the depth direction are linked with the real space (absolute positions associated with the real space).

The virtual objects 400 and 1500 are arbitrary three-dimensional figures. For example, the virtual objects 400 and 1500 can be set by acquiring information about an arbitrary three-dimensional figure created in advance using a computer or the like from an external device (such as an information processing apparatus or a second image pickup apparatus) via the communication unit 103. Alternatively, the virtual objects 400 and 1500 may be set by selecting a figure having a basic shape such as a rectangular parallelepiped or a cylinder (a figure created in advance and stored in the image pickup apparatus 4) using the operation unit 110, and disposing the selected figures at desired positions in the LV image displayed on the display unit 109. The virtual objects 400 and 1500 are placed at positions associated with the three-dimensional space information acquired in step S301. Thereby, the virtual objects 400 and 1500 are stored in the image pickup apparatus 4 as position information relative to the three-dimensional space (information about the absolute position) rather than conventional information about a relative position to the image pickup apparatus.

In step S1405, the calculating unit 101 controls the optical driving unit 107 so that the main object (object 403) and the virtual object 1500 are located within the imaging angle of view and determines an auto-framing position 1507. For example, the calculation unit 101 evaluates the angle of view based on a center-of-gravity position of the main object and a center-of-gravity position of the virtual object 1500, and controls the optical driving unit 107 the main object and the virtual object 1500 are included in the imaging angle of view.

This embodiment can perform auto-framing control such that both the main object and the area specified by the user are included in the imaging angle of view.

Fifth Embodiment

Figure 16:
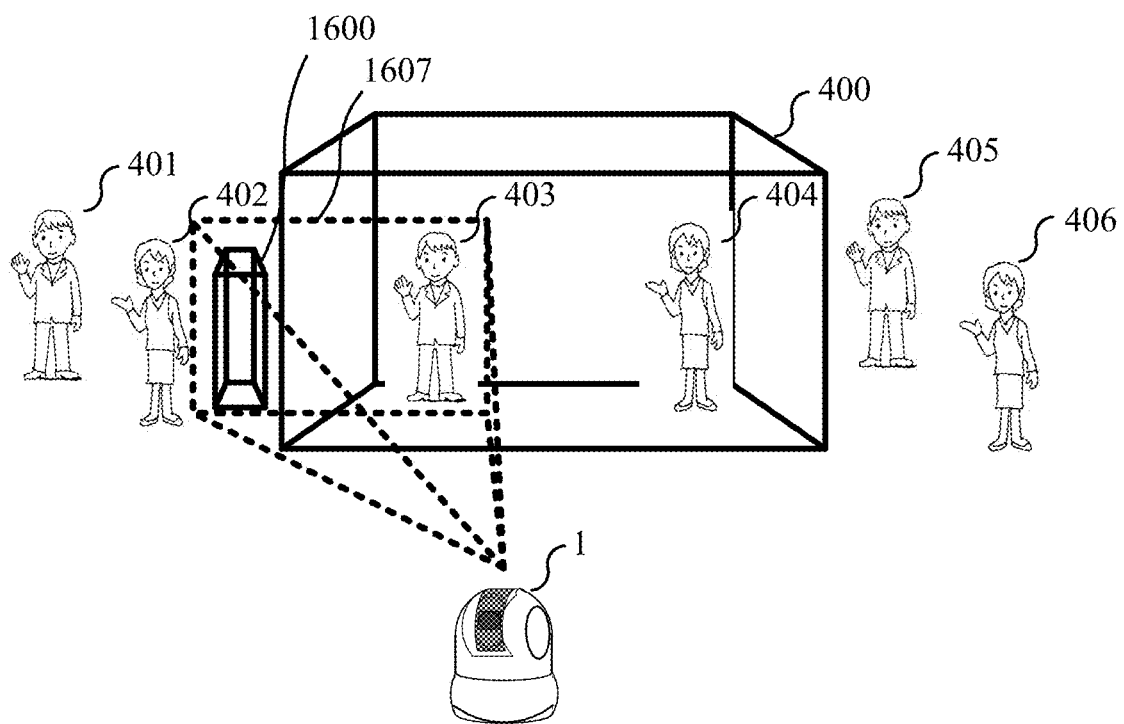
FIG. 16 is a schematic diagram illustrating a relationship between a search area and an auto-framing position in a fifth embodiment.

Referring now to FIGS. 13, 14, and 16, a description will be given of a control method (auto-framing control) according to a fifth embodiment. In the fourth embodiment, an example of auto-framing control is performed so as to include both a main object and an area other than the main object specified by the user in the imaging angle of view. In a case where an area other than the main object that is to be included in the imaging angle of view is outside the search area, the user also needs to specify the area other than the main object that is to be included in the imaging angle of view. Accordingly, this embodiment performs auto-framing control so as to include both the main object and the area other than the main object specified by the user in the imaging angle of view.

FIG. 13 is a block diagram illustrating a hardware configuration of an image pickup apparatus 4 according to this embodiment. In the image pickup apparatus 4 illustrated in FIG. 13, those elements having the same hardware configurations as those of the image pickup apparatus 1 illustrated in FIG. 1 will be designated by the same reference numerals, and a description thereof will be omitted. FIG. 14 is a flowchart of the control method according to this embodiment. In FIG. 14, steps similar to those in FIG. 3 will be designated by the same reference numerals, and a description thereof will be omitted. FIG. 16 is a schematic diagram illustrating a relationship between a search area and an auto-framing position. In FIG. 16, objects similar to those in FIG. 4 will be designated by the same reference numerals, and a description thereof will be omitted.

In step S1402 in FIG. 14, the calculating unit 101 places virtual objects 400 and 1600 as illustrated in FIG. 16, in accordance with an instruction from the user input via the communication unit 103 or the operation unit 110. That is, the calculating unit 101 generates an image in which the virtual objects 400 and 1600 are superimposed on the real space (three-dimensional space). Although the virtual object 1500 is placed inside the virtual object 400 in the fourth embodiment, the virtual object 1600 is placed outside the virtual object 400 in this embodiment.

In step S1405, the calculating unit 101 controls the optical driving unit 107 so that the main object (object 403) and the virtual object 1600 are located within the imaging angle of view, and determines an auto-framing position 1607. This embodiment determines the auto-framing position 1607 so that both the main object (object 403) and the virtual object 1600 are located within the imaging angle of view, but the disclosure is not limited to this example. For example, in a case where a distance between the main object and the virtual object 1600 is long (in a case where the distance between the main object and the virtual object 1600 is larger than a predetermined threshold), the auto-framing position may be determined so that only the main object is located within the imaging angle of view.

This embodiment can perform auto-framing control so as to include both the main object and the area outside the search area specified by the user in the imaging angle of view.

Sixth Embodiment

Figure 17:
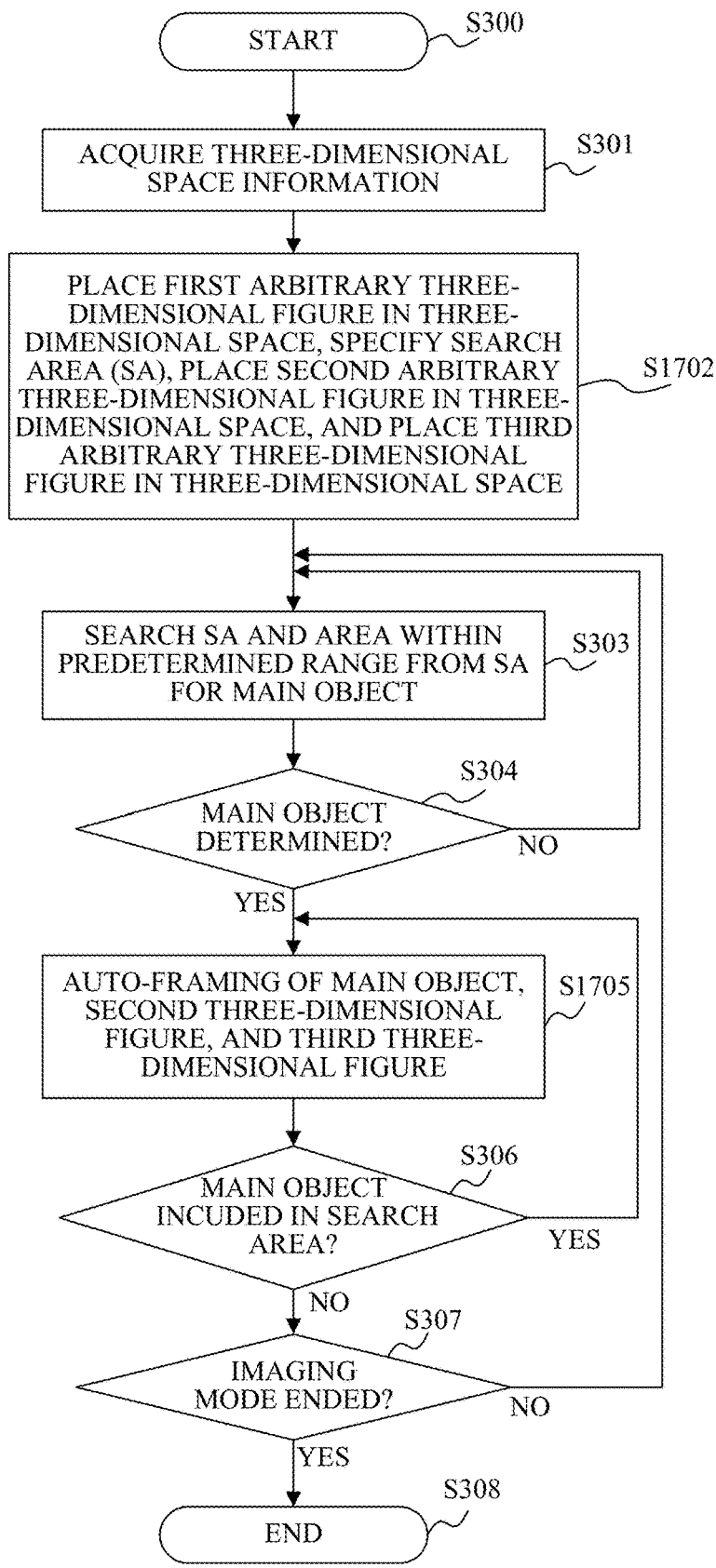
FIG. 17 is a flowchart of a control method according to a sixth embodiment.
Figure 18:
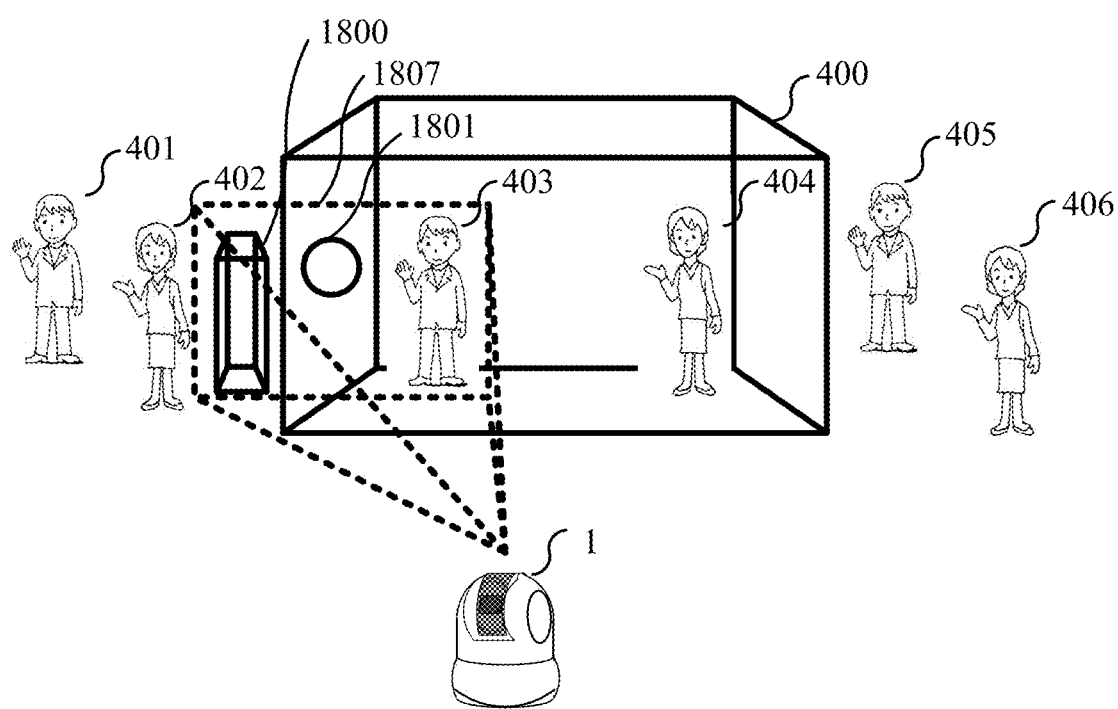
FIG. 18 is a schematic diagram illustrating a relationship between a search area and an auto-framing position in the sixth embodiment.

Referring now to FIGS. 13, 17, and 18, a description will be given of a control method (auto-framing control) according to a sixth embodiment. In the fourth embodiment, an example of auto-framing control is performed so as to include both a main object and an area other than the main object specified by the user in the imaging angle of view. In a case where there are a plurality of areas other than the main object to be included in the imaging angle of view, the user also needs to specify the plurality of areas other than the main object to be included in the imaging angle of view. Accordingly, this embodiment performs auto-framing control so as to include the main object and a plurality of areas other than the main object specified by the user in the imaging angle of view.

FIG. 13 is a block diagram illustrating a hardware configuration of an image pickup apparatus 4 according to this embodiment. In the image pickup apparatus 4 illustrated in FIG. 13, those elements having the same hardware configurations as those of the image pickup apparatus 1 illustrated in FIG. 1 will be designated by the same reference numerals, and a description thereof will be omitted. FIG. 17 is a flowchart of a control method according to this embodiment. In FIG. 17, steps similar to those in FIG. 3 will be designated by the same reference numerals, and a description thereof will be omitted. FIG. 18 is a schematic diagram illustrating a relationship between a search area and an auto-framing position. In FIG. 18, objects similar to those in FIG. 4 will be designated by the same reference numerals, and a description thereof will be omitted.

In step S1702 in FIG. 17, the calculating unit 101 places virtual objects 400, 1800, and 1801 as illustrated in FIG. 18, in accordance with an instruction from the user input via the communication unit 103 or the operation unit 110. That is, the calculating unit 101 generates an image in which the virtual objects 400, 1800, and 1801 are superimposed on the real space (three-dimensional space). In this embodiment, the virtual object 1800 is placed outside the virtual object 400 and the virtual object 1801 is placed inside the virtual object 400, but the disclosure is not limited to this example. For example, both virtual objects may be placed inside the virtual object 400, or both virtual objects may be placed outside the virtual object 400.

In step S1705, the calculating unit 101 controls the optical driving unit 107 so that the main object (object 403), the virtual objects 1800 and 1801 are located within the imaging angle of view, and determines an auto-framing position 1807.

This embodiment can perform auto-framing control so as to include the main object and a plurality of areas specified by the user in the imaging angle of view.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

Each embodiment can provide a control apparatus, an image pickup apparatus, a control method, and a storage medium, each of which can perform auto-framing control using a search area that correctly reflects the intention of the user.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application Nos. 2022-085504, filed on May 25, 2022, and 2022-160816, filed on Oct. 5, 2022, each of which is hereby incorporated by reference herein in its entirety.

What is claimed is:

1. A control apparatus comprising:
at least one processor; and
a memory coupled to the at least one processor,
wherein the memory has instructions that, when executed by the at least one processor, configure the processor to operate as a plurality of units comprising:
(1) an acquiring unit configured to acquire (a) information about three-dimensional space obtained using a distance measuring unit and (b) information about a three-dimensional figure specified by a user;
(2) a determining unit configured to determine a search area based on (a) the information about the three-dimensional space and (b) the information about the three-dimensional figure; and
(3) a control unit configured to automatically control an angle of view so that a main object in the search area is included in an imaging angle of view,
wherein the information about the three-dimensional figure includes (1) information about a first three-dimensional figure and (2) information about a second three-dimensional figure,
wherein the determining unit determines the search area based on (1) the information about the three-dimensional space and (2) the information about the first three-dimensional figure, and
wherein the control unit controls the angle of view so that the main object and the second three-dimensional figure in the search area are included in the imaging angle of view.

2. The control apparatus according to claim 1, wherein the determining unit determines the search area by placing the three-dimensional figure specified by the user at a selected position in an image displayed on a display unit.

3. The control apparatus according to claim 1, wherein the determining unit determines the search area based on the three-dimensional figure disposed in the three-dimensional space.

4. The control apparatus according to claim 1, wherein the search area is located inside the three-dimensional figure.

5. The control apparatus according to claim 1, wherein the search area is located outside the three-dimensional figure.

6. The control apparatus according to claim 1, wherein the determining unit searches the search area for an object and determines the main object.

7. The control apparatus according to claim 6, wherein the determining unit determines the main object based on an overlap degree between the search area and the object.

8. The control apparatus according to claim 7, wherein when determining that the object is entirely included in the search area based on the overlap degree, the determining unit determines the object as the main object.

9. The control apparatus according to claim 7, wherein when determining that the object is partially included in the search area based on the overlap degree, the determining unit determines the object as the main object.

10. The control apparatus according to claim 1, wherein the information about the three-dimensional space and the information about the three-dimensional figure are expressed in a relative coordinate system based on the control apparatus.

11. The control apparatus according to claim 1, wherein the control unit evaluates the angle of view based on a center-of-gravity position of the main object and a center-of-gravity position of the second three-dimensional figure, and controls the angle of view based on an evaluation result so as to include the main object and the second three-dimensional figure in the imaging angle of view.

12. The control apparatus according to claim 1, wherein the control unit controls the angle of view so as to include the main object in the imaging angle of view in a case where a distance between the main object and the second three-dimensional figure is equal to or larger than a predetermined threshold.

13. The control apparatus according to claim 1, wherein the second three-dimensional figure is located inside the first three-dimensional figure.

14. The control apparatus according to claim 1, wherein the second three-dimensional figure is located outside the first three-dimensional figure.

15. The control apparatus according to claim 1, wherein the information about the three-dimensional figure further includes information about a third three-dimensional figure,
wherein the determining unit determines the search area based on the information about the three-dimensional space and the information about the first three-dimensional figure, and
wherein the control unit controls the angle of view so that the main object, the second three-dimensional figure, and the third three-dimensional figure in the search area are included in the angle of view for imaging.

16. The control apparatus according to claim 15, wherein the second three-dimensional figure and the third three-dimensional figure are located inside the first three-dimensional figure.

17. The control apparatus according to claim 15, wherein the second three-dimensional figure and the third three-dimensional figure are located outside the first three-dimensional figure.

18. The control apparatus according to claim 15, wherein the second three-dimensional figure is located inside the first three-dimensional figure, and the third three-dimensional figure is located outside the first three-dimensional figure.

19. An image pickup apparatus comprising:
a control apparatus; and
an imaging unit,
wherein the control apparatus includes: at least one processor; and a memory coupled to the at least one processor,
wherein the memory has instructions that, when executed by the at least one processor, configure the processor to operate as a plurality of units comprising:
(1) an acquiring unit configured to acquire (a) information about three-dimensional space obtained using a distance measuring unit and (b) information about a three-dimensional figure specified by a user;
(2) a determining unit configured to determine a search area based on (a) the information about the three-dimensional space and (b) the information about the three-dimensional figure; and
(3) a control unit configured to automatically control an angle of view so that a main object in the search area is included in an imaging angle of view,
wherein the information about the three-dimensional figure includes (1) information about a first three-dimensional figure and (2) information about a second three-dimensional figure,
wherein the determining unit determines the search area based on (1) the information about the three-dimensional space and (2) the information about the first three-dimensional figure, and
wherein the control unit controls the angle of view so that the main object and the second three-dimensional figure in the search area are included in the imaging angle of view.

20. The image pickup apparatus according to claim 19, further comprising a driving unit configured to drive the imaging unit,
wherein the determining unit searches the search area for an object using the driving unit and determines the main object.

21. The image pickup apparatus according to claim 19, further comprising an operation unit,
wherein the three-dimensional figure is created by a user who has operated the operation unit.

22. The image pickup apparatus according to claim 19, further comprising a communication unit configured to communicate with an external device,
wherein the communication unit receives the information about the three-dimensional figure from the external device.

23. The image pickup apparatus according to claim 22, wherein the external device is an information processing device.

24. The image pickup apparatus according to claim 22, wherein the external device is a second image pickup apparatus.

25. The image pickup apparatus according to claim 19, wherein controlling the angle of view is to automatically control at least one of panning, tilting, and zooming so as to include the main object in the imaging angle of view.

26. The image pickup apparatus according to claim 19, further comprising a recognizing unit configured to recognize the three-dimensional space using the distance measuring unit.

27. A control method comprising the steps of:
acquiring (a) information about three-dimensional space obtained using a distance measuring unit and (b) information about a three-dimensional figure specified by a user;
determining a search area based on (a) the information about the three-dimensional space and (b) the information about the three-dimensional figure; and
automatically controlling an angle of view so that a main object in the search area is included in an imaging angle of view,
wherein the information about the three-dimensional figure includes (1) information about a first three-dimensional figure and (2) information about a second three-dimensional figure,
wherein the determining determines the search area based on (1) the information about the three-dimensional space and (2) the information about the first three-dimensional figure, and
wherein the controlling controls the angle of view so that the main object and the second three-dimensional figure in the search area are included in the imaging angle of view.

28. A non-transitory computer-readable storage medium storing a program that causes a computer to execute the control method according to claim 27.

* * * * *